(12) United States Patent
Cherkauer (10) Patent No.: US 8,671,175 B2
(45) Date of Patent: Mar. 11, 2014

(54) MANAGING SECURITY FEATURES OF A BROWSER

(75) Inventor: Kevin J. Cherkauer, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 12/984,706

(22) Filed: Jan. 5, 2011

(65) Prior Publication Data

US 2012/0173690 A1 Jul. 5, 2012

(51) Int. Cl.
*G06F 15/173* (2006.01)

(52) U.S. Cl.
USPC .......................................................... 709/223

(58) Field of Classification Search
None
See application file for complete search history.

(56) References Cited

U.S. PATENT DOCUMENTS

| | | | |
|---|---|---|---|
| 5,446,903 A | 8/1995 | Abraham et al. | |
| 6,308,273 B1 | 10/2001 | Goertzel et al. | |
| 7,194,464 B2 * | 3/2007 | Kester et al. | ............................ 1/1 |
| 8,020,190 B2 * | 9/2011 | Plummer | ............................ 726/1 |
| 2001/0042045 A1 | 11/2001 | Howard et al. | |
| 2005/0172229 A1 * | 8/2005 | Reno et al. | ...................... 715/700 |
| 2007/0005652 A1 * | 1/2007 | Choi et al. | .................. 707/104.1 |
| 2007/0011739 A1 * | 1/2007 | Zamir et al. | ...................... 726/22 |
| 2007/0199073 A1 * | 8/2007 | Plummer | ......................... 726/26 |
| 2008/0025243 A1 | 1/2008 | Corneille et al. | |
| 2008/0072300 A1 | 3/2008 | Garbow et al. | |
| 2008/0172738 A1 * | 7/2008 | Bates et al. | ...................... 726/22 |
| 2008/0201401 A1 * | 8/2008 | Pugh et al. | ...................... 709/201 |
| 2010/0125912 A1 | 5/2010 | Greenshpon et al. | |

FOREIGN PATENT DOCUMENTS

EP     1638016 A1 *  3/2006

* cited by examiner

*Primary Examiner* — Andrew L Nalven
*Assistant Examiner* — Christopher Ruprecht
(74) *Attorney, Agent, or Firm* — Paul S. Drake (57) ABSTRACT

A method, system, and computer usable program product for managing a security database in a computer memory by presenting a content delivery unit in a browser window on a computer display, identifying a plurality of domains associated with the content delivery unit wherein a first set of the plurality of domains is associated with hyperlinks in the content delivery unit, receiving user input selecting a security category for a second set of domains, and associating the second set of domains with the selected security category in the security database.

14 Claims, 8 Drawing Sheets

| Category 1 | Category 2 | Category 3 | All Protocols | HTTP: | HTTPS: | FTP: | |
|---|---|---|---|---|---|---|---|
| | | | | | | | ☐ Domain Level Review |
| | | | | | | | ☑ URL Level Review |
| ☒ | ☐ | ☐ | ☒ | ☐ | ☐ | ☐ | Current URL |
| ☐ | ☐ | ☐ | ☐ | ☐ | ☐ | ☐ | URL 1 |
| ☐ | ☑ | ☐ | ☐ | ☑ | ☐ | ☐ | URL 2 |
| ☒ | ☐ | ☐ | ☒ | ☐ | ☐ | ☐ | URL 3 |
| ☐ | ☒ | ☐ | ☐ | ☒ | ☐ | ☐ | URL 4 |
| ☐ | ☐ | ☐ | ☐ | ☐ | ☐ | ☐ | URL 5 |
| ☐ | ☐ | ☐ | ☐ | ☐ | ☐ | ☐ | |

720  725  730  740  750  755  760     770

Approve    Cancel
780              785

FIG. 9

MANAGING SECURITY FEATURES OF A BROWSER

BACKGROUND

1. Technical Field

The present invention relates generally to improved security management for a browser, and in particular, to a computer implemented method for managing the security database of a browser.

2. Description of Related Art

The Internet is a global system of interconnected computer networks that use standards based protocols to serve a variety of content to billions of users worldwide. The World Wide Web, or Web, is one of the services communicated via the Internet. The Web is a collection of interconnected content delivery units, for example web pages, linked by links, which include Uniform Resource Identifiers ("URIs"). URIs are classified as Uniform Resource Locators ("URLs"), as Uniform Resource Names ("URNs"), or both. A URL resembles a person's street address while a URN functions like a person's name.

A URL has a syntax and includes the protocol used to transfer data (e.g. http:, https: or ftp:), a server name and domain name used to identify the address of the server containing a webpage, a directory and subdirectory on the server, and filename and filetype of the content delivery unit. The form used for these URL addresses is protocol://servername.domainname/directory/subdirectory/filename.filetype. A domain name may be a host name that identifies Internet Protocol (IP) resources such as websites and may be used as an identification label to indicate ownership or control of a resource. Domain names are formed by the rules and procedures of the domain name system (DNS). A content delivery unit located at the address identified by a URL may be a web page, an image, a video, or other discrete piece of content. A web browser is used to retrieve, present, and traverse the interconnected content delivery units on the Web.

The Web has become a pathway for spreading malware and carrying out cybercrime such as identity theft, fraud, espionage and intelligence gathering. Content delivery units on the Web are frequent sources of infection of personal computers by malware, spyware, worms, viruses, and other unwanted and/or dangerous programs. Because of the malware and cybercrime on the Web, many web browsers contain security features to attempt to prevent or reduce the risk of infection and criminal activity.

Some web browsers, such as Internet Explorer (IE), have a security feature whereby a user can set different security policies or levels for specific web sites (Internet Explorer is a registered trademark of Microsoft Corporation, in the United States and other countries). For unknown or unfamiliar web sites, a strict security policy is recommended to prevent or disable potentially dangerous features, such as ActiveX, JavaScript, automatic redirection to another web site, outsourcing some of the website's functionality to another website, or automatic installation of new software that a cybercriminal could exploit (ActiveX is a registered trademark of Microsoft Corporation, in the United States and other countries; JavaScript is a registered trademark of Sun Microsystems, Inc., or Oracle Corporation, in the United States and other countries). However, a more relaxed, less strict security policy for a trusted or known information resource is often needed to enable the full functionality of the features found in many modern web sites.

IE allows a user, through a series of menus, to store a URL for any specific website in a security database and assign one of several predefined security levels for that URL. The user may repeat this process for other URLs over time, thereby building the security database. The user may then enable or disable specific web site features for each predefined security level. There is a plug-in feature for Firefox called NoScript which allows a user to assign the URL of the currently accessed webpage to a single predefined "trusted" security status by pressing/clicking a button on a tool bar. As a result, the currently accessed webpage is enabled full functionality. The user may repeat this process for other webpages accessed by the user. As a result, when a user accesses one of these "trusted" webpages again, the system remembers the previously assigned "trusted" security status for the URL of that webpage and again enables full functionality for that webpage.

SUMMARY

The illustrative embodiments provide a method, system, and computer usable program product for managing a security database in a computer memory by presenting a content delivery unit in a browser window on a computer display, identifying a plurality of domains associated with the content delivery unit wherein a first set of the plurality of domains is associated with hyperlinks in the content delivery unit, receiving user input selecting a security category for a second set of domains, and associating the second set of domains with the selected security category in the security database.

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

DETAILED DESCRIPTION

Figure 1:
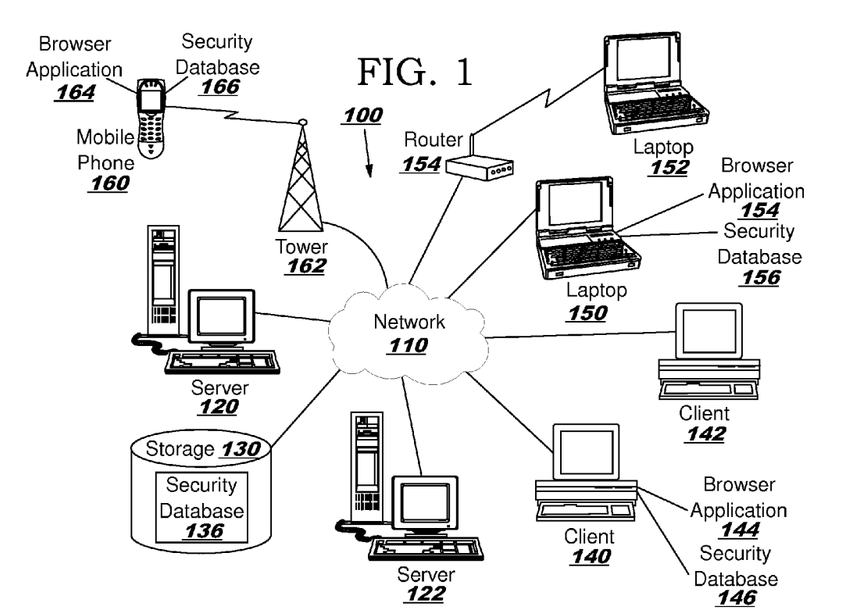
FIG. 1 depicts a pictorial representation of a network of data processing systems in which the illustrative embodiments may be implemented.

FIG. 1 depicts a pictorial representation of a network of data processing systems in which illustrative embodiments may be implemented. Data processing environment 100 is a network of data processing systems also known as computers in which the illustrative embodiments may be implemented. Software applications may execute on any computer or other type of data processing system in data processing environment 100. Data processing environment 100 includes network 110. Network 110 is the medium used to provide communications links between various devices and computers connected together within data processing environment 100. Network 110 may include connections such as wire, wireless communication links, or fiber optic cables.

Servers 120 and 122 and clients 140 and 142 are coupled to network 110 along with storage unit 130. In addition, laptops 150 and 152 are coupled to network 110 including wirelessly through a network router 154. A mobile phone 160 is also coupled to network 110 through a mobile phone tower 162. Data processing systems, such as server 120 and 122, client 140 and 142, laptops 150 and 152, and mobile phone 160, may contain data and may have software applications or software tools executing thereon. Other types of data processing systems such as personal digital assistants (PDAs), tablets and netbooks may be coupled to network 110.

Storage 130 may include security database 136 in accordance with embodiments described herein. Client 140 may include browser application 144 and security database 146. Laptop 150 and mobile phone 160 may also include browser applications 154 and 164 and security databases 156 and 166. Other types of data processing systems coupled to network 110 may also include browser applications and security databases. Browser applications could include a web browser, email, or other software application that can process or execute a content delivery unit such as a web page, an email, or other discrete type of information to be processed.

Servers 120 and 122, storage unit 130, clients 140 and 142, laptops 150 and 152, and mobile phone 160 and other data processing devices may couple to network 110 using wired connections, wireless communication protocols, or other suitable data connectivity. Clients 140 and 142 may be, for example, personal computers or network computers.

In the depicted example, server 120 may provide data, such as boot files, operating system images, and applications to clients 140 and 142 and laptop 150. Clients 140 and 142 and laptop 150 may be clients to server 120 in this example. Clients 140 and 142, laptops 150 and 152, mobile phone 160, or some combination thereof, may include their own data, boot files, operating system images, and applications. Data processing environment 100 may include additional servers, clients, and other devices that are not shown.

In the depicted example, data processing environment 100 may be the Internet. Network 110 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

Figure 2:
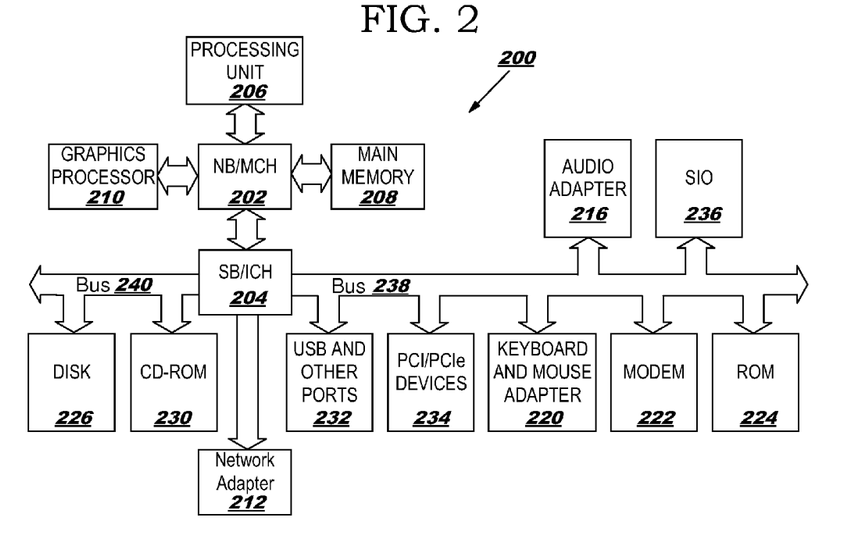
FIG. 2 depicts a block diagram of a data processing system in which the illustrative embodiments may be implemented.

FIG. 2 depicts a block diagram of a data processing system in which illustrative embodiments may be implemented. Data processing system 200 is an example of a computer, such as server 120 or client 140 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations. In some configurations, processing unit 206 may include NB/MCH 202 or parts thereof.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). In some configurations, ROM 224 may be an Electrically Erasable Programmable Read-Only Memory (EEPROM) or any other similarly usable device. Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provide calls to the operating system from Java™ programs or applications executing on data processing system 200 (Java is a trademark of Sun Microsystems, Inc., or Oracle Corporation, in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a mobile phone 160, PDA, netbook or other type of data processing system which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
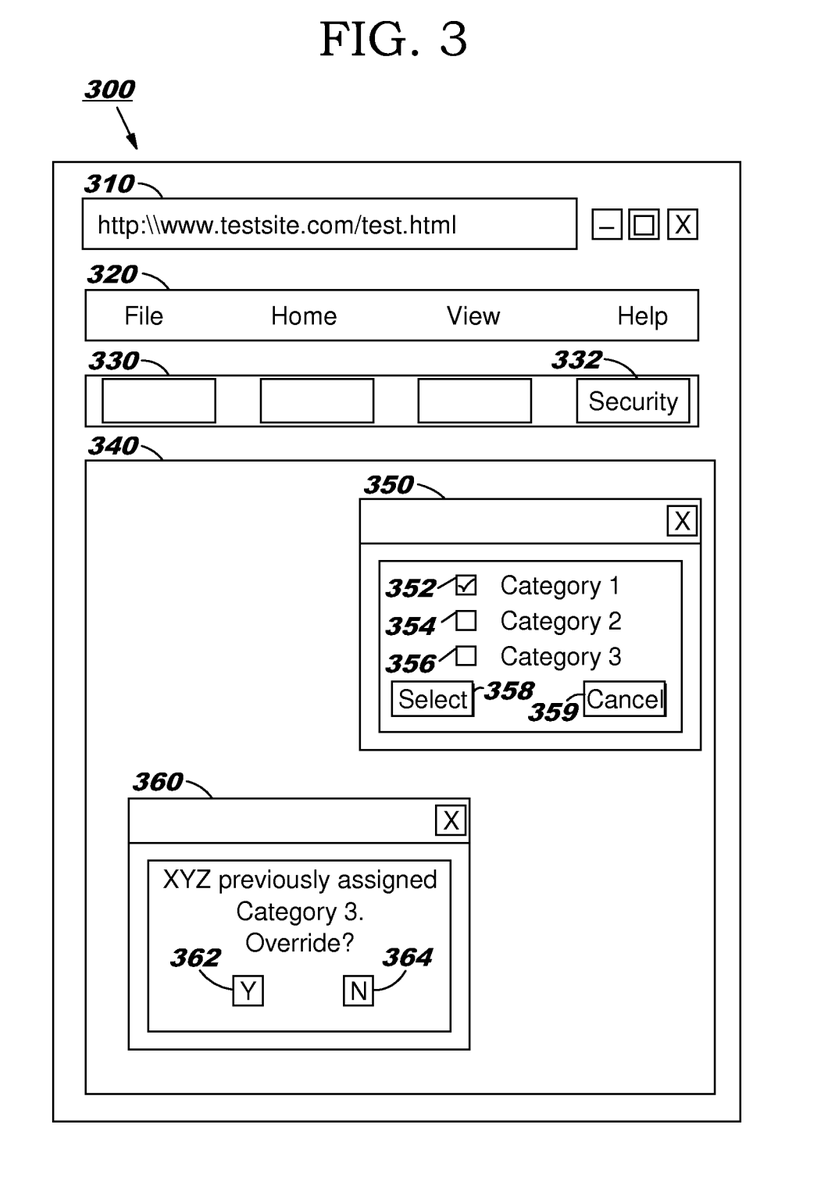
FIG. 3 depicts a block diagram of an example device with respect to managing the security features of a web browser in accordance with a first embodiment.

FIG. 3 depicts a block diagram of an example device with respect to managing the security features of a web browser in accordance with a first embodiment. Other types of browsers such as an email browser application could also implement similar embodiments. Web browser 300 may be any application usable to access and navigate the Web, such as web browser applications 144, 154 or 164 in client 140, laptop 150 or mobile phone 160 in FIG. 1. Generally, any browser application capable of accessing the internet or capable of inducing another application to access the internet may be represented by web browser 300.

Web browser 300 includes an address bar 310, menu bar 320, tool bar 330 and display area 340. Display area 340 may be used to display a webpage or other content delivery unit being accessed by the web browser. The webpage or other content delivery unit may contain a plurality of links or webpage addresses or domain names that a user may be able to use or click on to access other content delivery units such as other webpages. Address bar 310 may be used for indicating the URL of a content delivery unit (such as a webpage) displayed in display area 340. For example, if a user mouse clicks on a link shown in display area 340, the URL of that content delivery unit may be displayed in address bar 310 and the content delivery unit may be accessed and rendered by web browser 300 in display area 340. In addition, if a user types a URL in address bar 310 and presses enter, then the addressed content delivery unit may be accessed by the web browser 300 and rendered in display area 340. Alternative embodiments may use different forms of a user interface to accomplish the same or similar functionality. Also shown is menu bar 320 which includes several headers such as FILE and HELP. If a user mouse clicks on a header, then the system may provide a pull-down menu listing several options for the user to select. Each of these options may allow the user to control the functionality of the web browser 300. A taskbar 330 is also shown with multiple buttons. In particular, one button is identified as security button 332. If a user mouse clicks on a button, then web browser 300 may perform certain functions. In this embodiment, each button may cause web browser 300 to perform a single function such as access and display a specific URL, or cause web browser 300 to perform other types of tasks. For example, button 332 may cause web browser 300 to generate a functional pop-up window 350. The user may also instruct the web browser to generate pop-up window 350 through a header on menu bar 320, through a mouse right click pull-down menu, or other possible user interface capabilities.

In this first embodiment, pop-up window 350 includes various options for a user to select. These include boxes 352, 354 and 356 for a user to select or deselect with mouse clicks and buttons 358 or 359 to press with a key entry or mouse click when the selection is complete or to be cancelled. Also shown is pop-up window 360 with buttons 362 and 364. The functionality of pop-up windows 350 and 360 will be provided in greater detail with reference to FIG. 4. Alternative embodiments may be use other types of user interfaces to perform the same or similar functionality described for pop-up windows 350 and 360, as well as the other elements of this FIG. 3.

Figure 4:
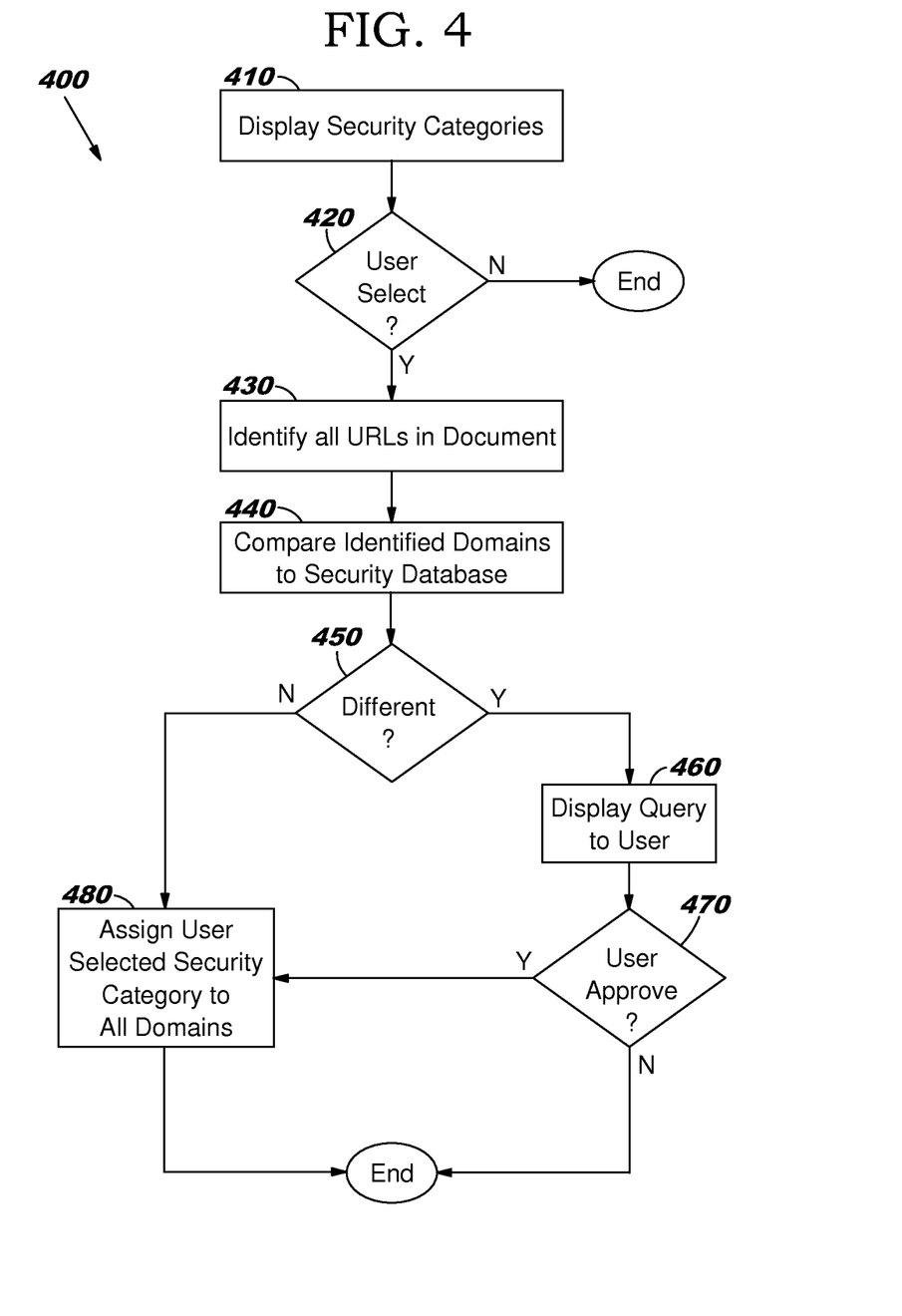
FIG. 4 depicts a flowchart of an example process for managing the security features of a web browser in accordance with the first embodiment.

FIG. 4 depicts a flowchart 400 of an example process for managing the security features of a web browser in accordance with the first embodiment. In this embodiment, a user may quickly assign a single security category to all domains contained within the webpage, including the domain of the webpage being accessed. The user may initiate this process by clicking on security button 332 as shown in FIG. 3. In alternative embodiments, the user may initiate this process by right clicking a mouse and selecting an appropriate choice from a resulting pulldown menu, or by selecting one of the menu items on menu bar 320 and selecting an appropriate choice from a resulting pull-down menu. In this embodiment, pop-up window 350 results from the user selecting security button 332 or from the other alternatives described above.

In step 410, the various security categories are displayed such as in a pop-up window 350. In this first embodiment, security categories are shown as Category 1, Category 2 and Category 3. An example would be categories such as trust, neutral and restrict where trust allows a webpage to fully function, neutral limits some high risk functionality, and where restrict limits all but low risk functionality. There may be many categories that a user or software developer may establish for a given web browser as this embodiment is not limited to three security categories. Also those security categories may not be hierarchical, but just different from each other in some aspect. These security categories may be established and modified by a browser software developer, a user, an administrator or some combination thereof.

Once the security categories are displayed, then the user may select a desired security category by selecting a box next to the desired security category. In FIG. 3, Category 1 is shown as being selected in box 352. The user can then confirm the selection by mouse clicking on box 358 or other alternative means. In step 420, if the user selected any one of boxes 352, 354 or 356, then this process continues to step 430, otherwise this process may end as no security categories were selected by the user (or if the user selected the Cancel button 359 in lieu of Approve button 358).

In step 430, all URLs may be identified within the webpage and the domains contained within those URLs as well as the domain of the current webpage. Domain names are derived from the URLs based on the standard URL format protocol:// servername.domainname/directory/subdirectory/filename.filetype. In step 440 a determination may be made whether any of the identified domains were already previously assigned security categories in the security database. If so, then in step 450, a determination may be made if the security category is different than the security category selected by the user. If yes, then in step 460 a query may be displayed to the user such as in pop-up window 360. This query is to determine whether the user wants to override the previously assigned security category in the security database for a domain identified within the webpage. In step 470, if the user does not approve the change in security category, then this process comes to an end and no security category is assigned to any of the domains identified in the webpage. If the user approves the override in step 470, then this process continues to step 480. In an alternative embodiment, steps 440 through 470 may be optional whereby the user is not queried if a domain was assigned a security category different from what was selected by the user in step 420. As a result, in this alternative embodiment, any previously assigned security category for a domain may be overridden without warning. In step 480, the security database is updated whereby each identified domain is assigned or associated with the selected security category in the security database. The domains and associated security category may be stored in the security database, including the use of wildcards, as described below with reference to FIG. 9.

In an alternative embodiment, instead of domains being approved in certain security categories, URLs contained in the webpage may be approved instead. While that may assign a desired security category to all links in the webpage, the user may need to perform this process again for any other links or webpages corresponding to the domains contained in the webpage of the above example embodiment.

Figure 5:
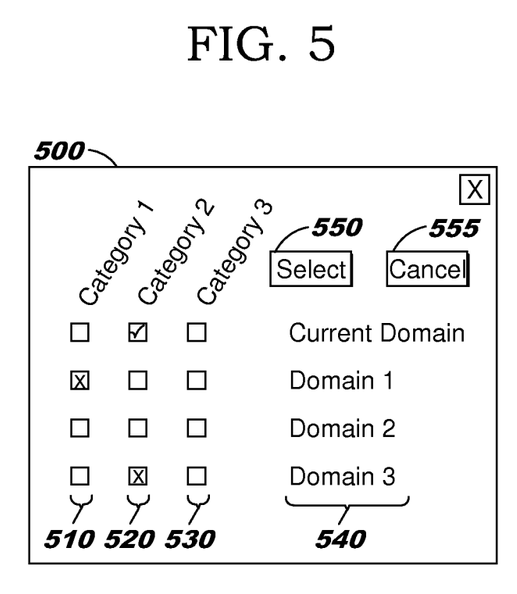
FIG. 5 depicts a block diagram of an example device with respect to managing the security features of a web browser in accordance with a second embodiment.

FIG. 5 depicts a block diagram 500 of an example device with respect to managing the security features of a web browser in accordance with a second embodiment. This embodiment is an alternative embodiment for implementing the web browser illustrated in FIG. 3. In particular, an alternative pop-up window 500 is shown that could be generated by a user selecting button 332 of FIG. 3. Pop-up window 500 includes three columns of boxes 510, 520 and 530, one for each security category. If there were 4 categories, then 4 columns of boxes could be shown. There is also a column 540 of domain names listed. There may be a row of boxes, one from each security category, adjoining each domain listed. Also shown is an Approval button 550 and Cancel button 555. The use of this pop-up window is described with respect to FIG. 6 below.

Figure 6:
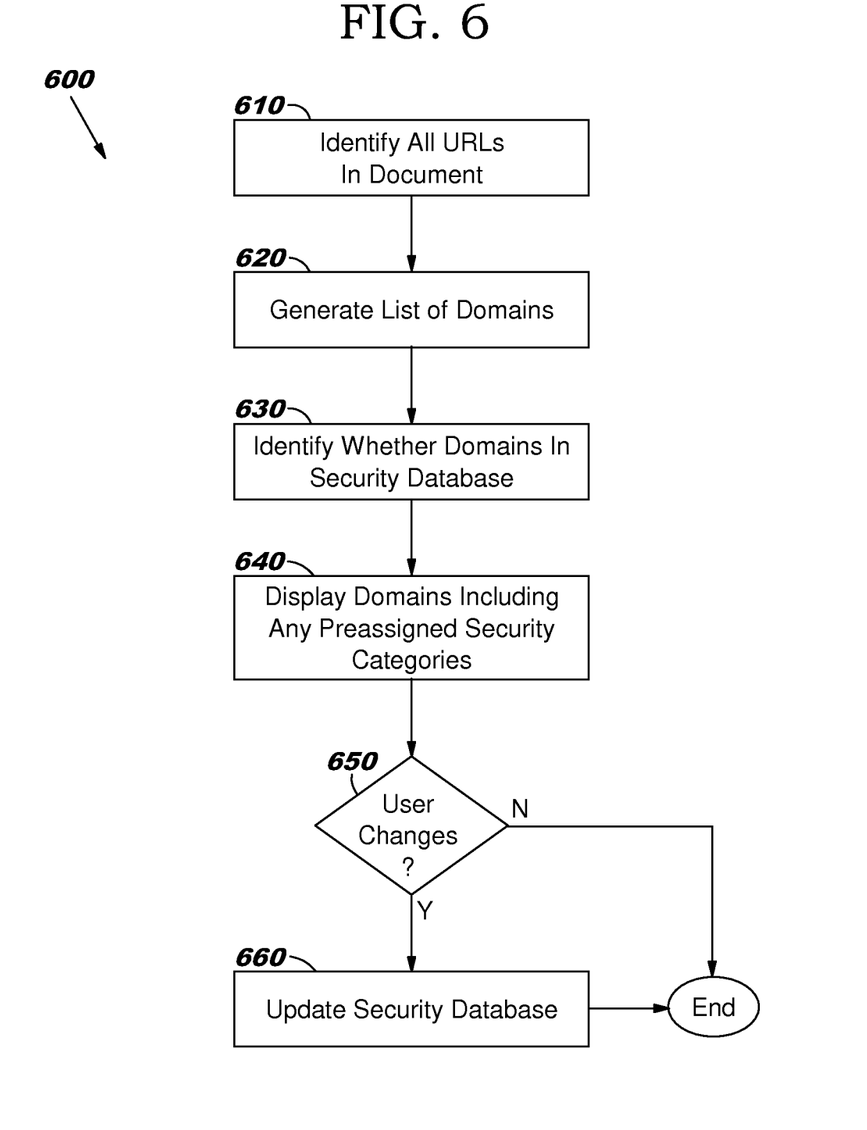
FIG. 6 depicts a flowchart of an example process for managing the security features of a web browser in accordance with the second embodiment.

FIG. 6 depicts a flowchart of an example process for managing the security features of a web browser in accordance with the second embodiment. This process may be initiated by a user selecting security button 332 of FIG. 3. In a first step 610, all URLs may be listed in the content delivery unit, starting with the domain of the content delivery unit itself (CURRENT DOMAIN). In step 620, a list of domains may be generated from the identified URLs, starting with the domain of the webpage being accessed. In step 630, the list of domains is compared against the security database to identify whether any of those domains were previously assigned security categories in the security database. In step 640, a pop-up window 500 may be displayed as shown in FIG. 5.

As shown in the example pop-up window 500, two domains identified in the content delivery unit were previously assigned security categories in the security database. DOMAIN1 was assigned CATEGORY1 and DOMAIN3 was assigned CATEGORY2. These are shown in this example as an X in the appropriate box next to the domain names. The user may override this previous assignment by simply selecting a different box adjoin the relevant domain. Also, if a domain does not have a pre-assigned security category, the user may assign one by selecting the appropriate box next to a domain. In the example given, the user has selected CATEGORY2 for the CURRENT DOMAIN as shown by a check mark. A check mark is used to show that this was a new user selection. The user may then request the updates be made by selecting Approve button 550 or cancel the request by selecting Cancel button 555. In an alternative embodiment, the list of domains may not be compared against the security database in step 630. As a result, the pop-up window would not display an X showing a previously selected security category for a given domain. In this alternative embodiment, any previously assigned security category for a domain may be overridden without warning.

In step 650, a determination may be made whether or not any changes or new selections were made by the user in response to the user selecting approve button 550. In this example, that would be yes for the Current Domain. As a result, in step 660 the security database is updated accordingly. If no changes or new selections were made by the user or if the user had selected Cancel button 555, then processing would end without updating the security database. The domains and associated security categories may be stored in the security database, including the use of wildcards, as described below with reference to FIG. 9.

Figure 7:
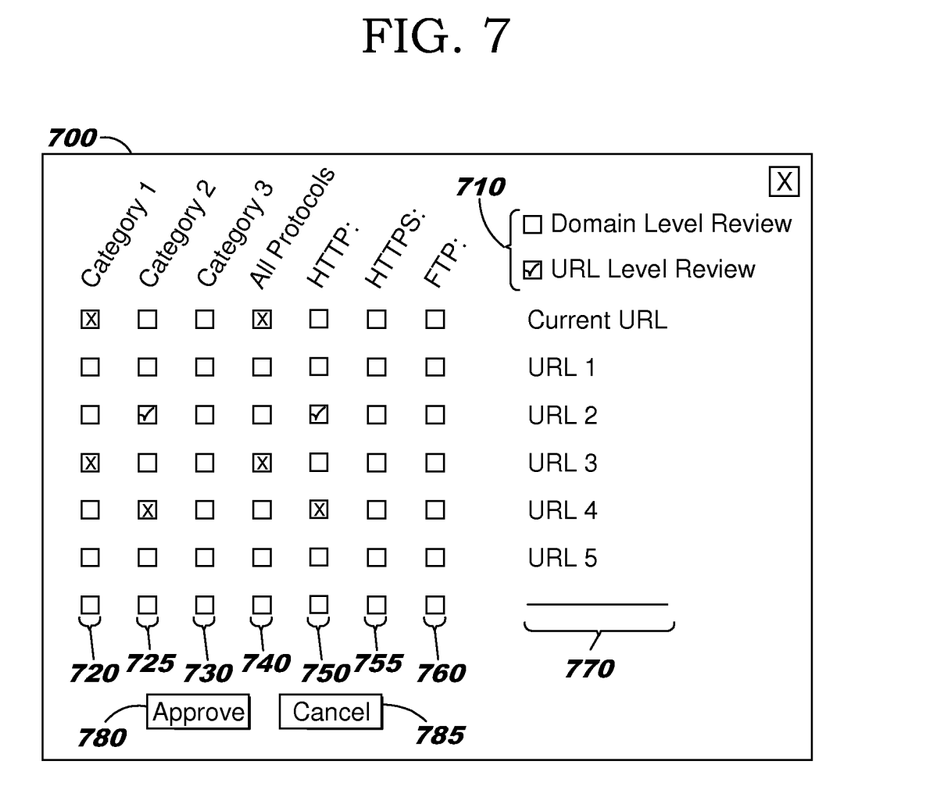
FIG. 7 depicts a block diagram of an example device with respect to managing the security features of a web browser in accordance with a third embodiment.

FIG. 7 depicts a block diagram 700 of an example device with respect to managing the security features of a web browser in accordance with a third embodiment. This embodiment is another alternative embodiment for implementing the web browser illustrated in FIG. 3. This embodiment may give the user greater flexibility in reviewing and approving security categories for either URLs or domains identified within the webpage being accessed by the web browser. In this embodiment, the user may also review and approve a security category for selected protocols for a domain or URL. An alternative pop-up window 700 is shown that could be generated by a user selecting button 332 of FIG. 3. Pop-up window 700 includes two boxes 710 for a user to select whether to review links at a domain level (similar to FIGS. 5 and 6) or at an URL level. That is, the user may review and approve security categories for domains contained within the webpage. In the alternative, the user may review and approve security categories for URLs contained within the webpage. If the user selects URL level review, then those URLs contained within the webpage may be reviewed and assigned security categories. As a result, other URLs may not be assigned a security category, even if they have the same domain as another URL assigned a security category. In this example, the user has selected URL level review as shown by the check mark in the corresponding box.

Pop-up window 700 includes three columns of boxes 720, 725 and 730, one for each security category in this example. If there were 4 categories, then 4 columns of boxes could be shown. There are also columns 740, 750, 755 and 760 where the user may select which protocols to approve for a given URL in this example. Column 740 allows the user to select all protocols for a given URL. Additional protocols may be selectable by adding more columns, one for each protocol. Column 770 is a column showing URLs identified in the current content delivery unit. The first URL listed is the URL for the content delivery unit currently accessed. The last row of column 770 is a place for the user to type in a URL if so desired. Also shown is an Approval button 780 and Cancel button 785. The use of this pop-up window is described with respect to FIG. 8 below.

Figure 8:
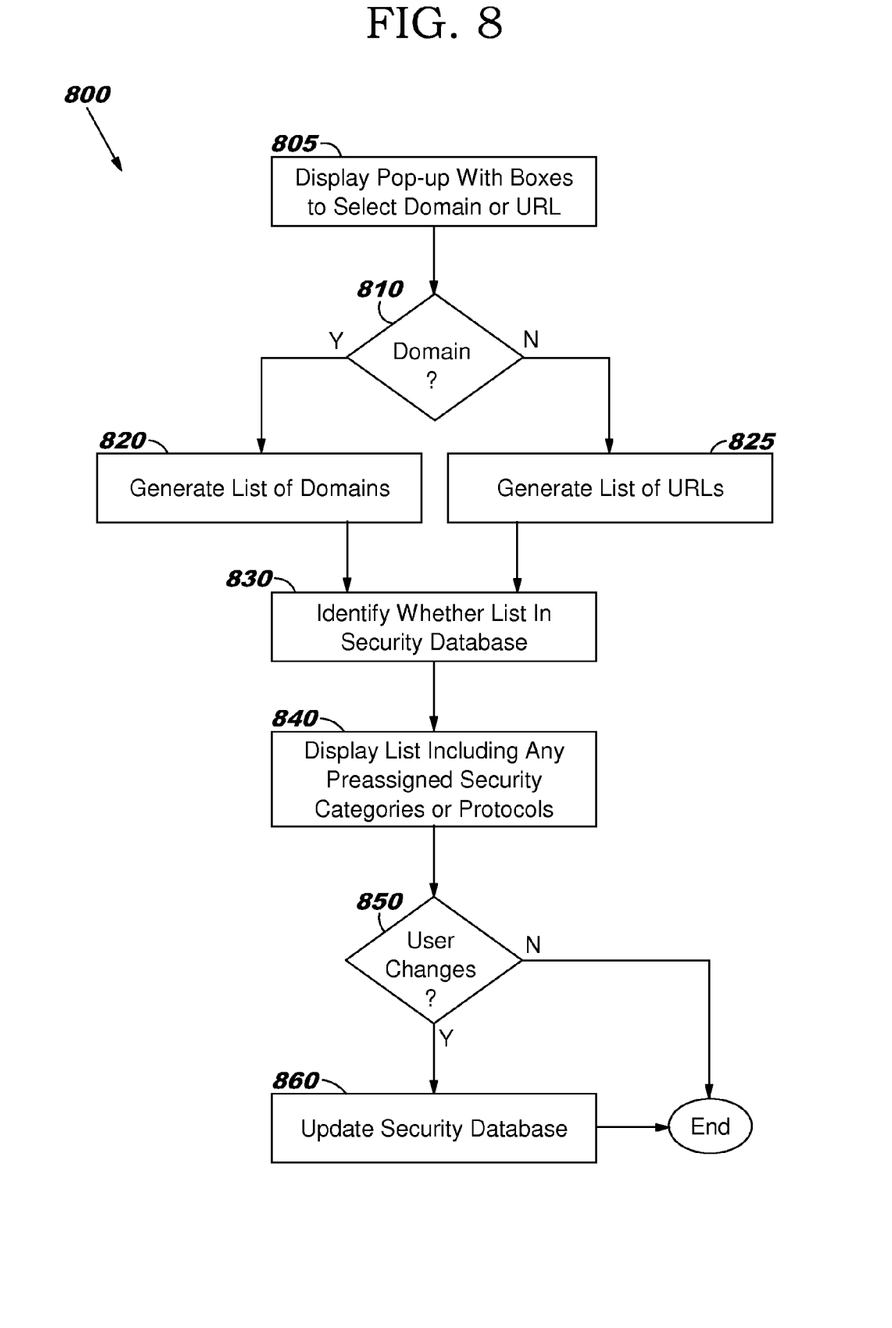
FIG. 8 depicts a flowchart of an example process for managing the security features of a web browser in accordance with the third embodiment.

FIG. 8 depicts a flowchart 800 of an example process for managing the security features of a web browser in accordance with the third embodiment. This process may be initiated by a user selecting security button 332 of FIG. 3. In a first step 805, pop-up box 700 may be displayed without any URLs or domains listed. What may be shown are boxes 710 where the user may indicate whether the user wants to review links at the domain or URL level. In step 810, it may be determined whether the user selected the box for domains or URLs. If domains, then processing continues to step 820, otherwise to step 825. In an alternative embodiment, the system may start with domains (or URLs) and assume that is what the user desires until the user indicates otherwise by selecting a different box in 710.

In step 820, a list of domains may be generated from the content delivery unit being accessed, starting with the domain of the content delivery unit being accessed. In the alternative, in step 825, a list of URLs may be generated from the content delivery unit being accessed, starting with the URL of the content delivery unit being accessed. In step 830, the list may be checked against the security database identify whether any of those domains or URLs in the list were previously assigned security categories in the security database. In some embodiments, domains or URLs that were not previously assigned security categories by the user may automatically belong to a default security category. Steps 830, 840 and 850 may be optional, whereby the user may override a previous security category for a given URL or domain without warning. In step 840, a pop-up window 700 may be displayed as shown in FIG. 7.

As shown in the example pop-up window 700, the CURRENT URL plus URL3 and URL4 were identified as previously assigned security categories in the security database. The CURRENT URL was assigned CATEGORY1 for all protocols, URL3 was assigned CATEGORY1 for all protocols, and URL4 was assigned CATEGORY2 for the HTTP protocol. These are shown in this example as an X in the appropriate boxes next to the URL names. The user may override this previous assignment by simply selecting a different box adjoining the relevant URL. Also, if a URL does not have a pre-assigned security category, the user may assign one by selecting the appropriate box next to a URL. In the example given, the user has selected CATEGORY2 and HTTP protocol for URL2 as shown by check marks in the corresponding boxes. A check mark is used to show that this was a new user selection. The user may then request the updates be made by selecting Approve button 780 or cancel by selecting Cancel button 785.

In step 850, in response to the user selection of button 780, a determination may be made whether any changes or new selections were made by the user (or if the user selected button 785 cancelling the operation). In this example, that would be yes for the URL2. As a result, in step 860 the security database is updated accordingly. If no changes or new selections were made by the user or if the user had selected Cancel button 785, then processing would end without updating the security database. The domains and associated security category may be stored in the security database, including the use of wildcards, as described below with reference to FIG. 9.

Figure 9:
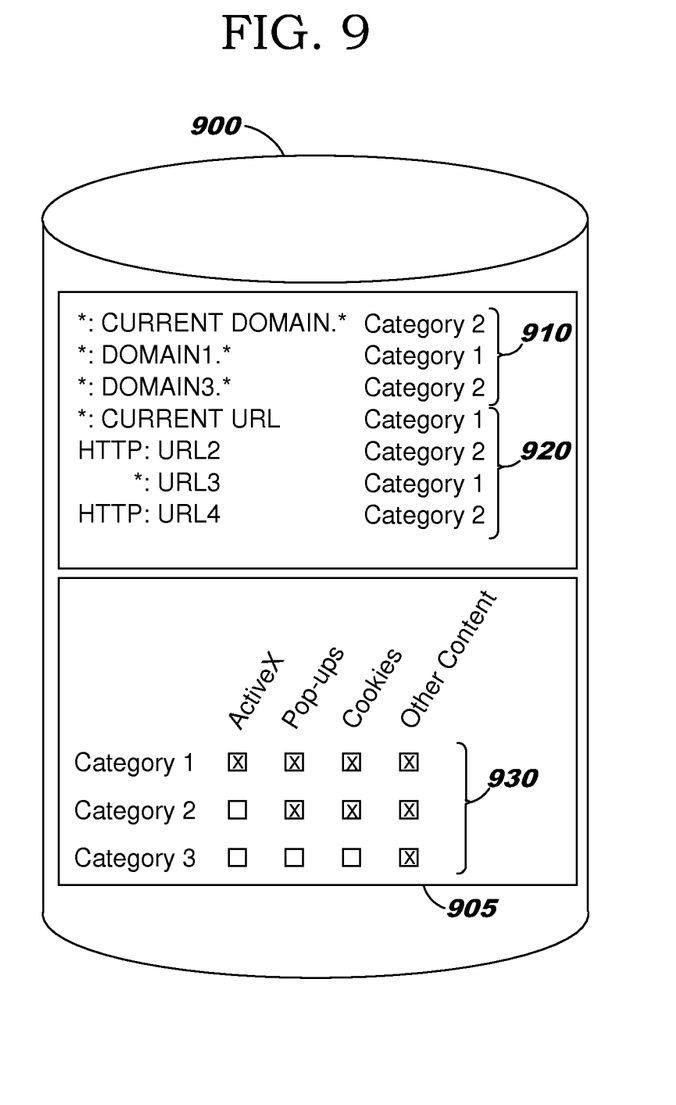
FIG. 9 depicts a block diagram of an example security database in accordance with the first, second and third embodiments of FIGS. 3-8.

FIG. 9 depicts a block diagram 900 of an example security database in accordance with the first, second and third embodiments of FIGS. 3-8. Shown is a security database 905 stored in memory such as in storage 130, a hard drive disk 226, or other storage medium.

Element 910 shows a list of domains approved in the example above with reference to the second embodiment and FIGS. 5-6. Since no protocols were specified in that example, it is assumed all protocols were approved as indicated by a "*:" wildcard. This is followed by the domain names approved and subsequently by a ".*" wildcard to indicate that all URLs for those domains were approved. Further adjoining each domain is a security category approved for that domain. Element 920 shows a list of URLS approved in the example above with reference to the third embodiment and FIGS. 7-8. As shown, the CURRENT URL and URL3 are approved for all protocols as indicated by the "*:" wildcard whereas URL2 and URL4 are approved only for the HTTP: protocol. Also shown adjoining each URL is a security category approved for that URL.

Element 930 shows the various approvals for each security category. These may be preset by the software developer and customized by a user or administrator. As shown, Category 1 is the most trusted where a trusted content delivery unit may execute a variety of actions and Category 3 is the least trusted.

Alternative security database embodiments could include using separate databases for domains and URLs assigned to selected security levels, the use of alternative wildcards or other similar schemes, and other embodiments that one of ordinary skill in the art could implement.

Thus, a computer implemented method, apparatus, and computer program product are provided in the illustrative embodiments for managing the security features of a web browser. Using an embodiment of the invention, content delivery units and links can be managed. Using an embodiment of the invention, a user may be less likely to set a more relaxed, less strict security policy for all content delivery units because links of multiple protocols may be designated as trusted resources in a single action and the full functionality of the content delivery units are obtained. In addition, the status of an information resource can be easily determined and changed from trusted to not trusted or not trusted to trusted as compared to in the presently available methods for managing security.

The invention can take the form of an entirely software embodiment, or an embodiment containing both hardware and software elements. In a preferred embodiment, the invention is implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM) or other nonvolatile memory types such as flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiments were chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of managing a security database in a computer memory, comprising:

presenting a content delivery unit including a plurality of URLs in a browser window on a computer display;

identifying a domain associated with the content delivery unit from a URL associated with the content delivery unit;

identifying a first set of URLs from the plurality of URLs included in the content delivery unit;

identifying a plurality of domains associated with the content delivery unit from the plurality of URLs, wherein a first set of domains is identified from the first set of URLs;

presenting a list of domains and a set of security categories to the user, the list of domains comprising the domain associated with the content delivery unit and the first set of domains;

receiving user input selecting a security category for a second set of domains, the second set of domains comprising a subset of the domain associated with the content delivery unit and the first set of domains based on the user input; and associating the second set of domains with the selected security category in the security database.

2. The method of claim 1, further comprising receiving user input selecting an initial security category prior to presenting the list of domains, wherein presenting the list of domains and the set of security categories to the user includes presenting the selected initial security category to the user, and wherein receiving user input selecting a security category further includes receiving user input regarding the selected initial security category.

3. The method of claim 1, wherein presenting the list of domains and the set of security categories to the user further includes presenting a plurality of protocols to the user, wherein receiving user input further includes receiving user input selecting a set of the plurality of protocols for the second set of domains, and wherein associating in the security database further includes associating the second set of domains with the selected set of the plurality of protocols in the security database.

4. The method of claim 1, further comprising:
determining whether any of the second set of domains was previously assigned a security category in the security database; and
determining whether the previously assigned security category is different from the selected security category, wherein receiving user input selecting a security category for the second set of domains further includes the user overriding a previously selected security category, and wherein associating the second set of domains with the selected security category in the security database includes replacing a previously selected security category associated with the second set of domains in the security database.

5. The method of claim 1, further comprising:
presenting a list of URLs and the set of security categories to the user, the list of URLs comprising the URL associated with the content delivery unit and the first set of URLs;
receiving user input selecting a security category for a second set of URLs, the second set of URLs comprising a subset of the URL associated with the content delivery unit and the first set of URLs based on the user input; and
associating the second set of URLs with the selected security category in the security database.

6. A computer usable program product comprising a non-transitory computer usable storage medium including computer usable code for use in managing a security database in a computer memory, the computer usable program product comprising code for:
presenting a content delivery unit including a plurality of URLs in a browser window on a computer display;
identifying a domain associated with the content delivery unit from a URL associated with the content delivery unit;
identifying a first set of URLs from the plurality of URLs included in the content delivery unit;
identifying a plurality of domains associated with the content delivery unit from the plurality of URLs, wherein a first set of domains is identified from the first set of URLs;
presenting a list of domains and a set of security categories to the user, the list of domains comprising the domain associated with the content delivery unit and the first set of domains;
receiving user input selecting a security category for a second set of domains, the second set of domains comprising a subset of the domain associated with the content delivery unit and the first set of domains based on the user input; and
associating the second set of domains with the selected security category in the security database.

7. The computer usable program product of claim 6, further comprising receiving user input selecting an initial security category prior to presenting the list of domains, wherein presenting the list of domains and the set of security categories to the user includes presenting the selected initial security category to the user, and wherein receiving user input selecting a security category further includes receiving user input regarding the selected initial security category.

8. The computer usable program product of claim 6, wherein presenting the list of domains and the set of security categories to the user further includes presenting a plurality of protocols to the user, wherein receiving user input further includes receiving user input selecting a set of the plurality of protocols for the second set of domains, and wherein associating in the security database further includes associating the second set of domains with the selected set of the plurality of protocols in the security database.

9. The computer usable program product of claim 6, further comprising code for:
determining whether any of the second set of domains was previously assigned a security category in the security database; and
determining whether the previously assigned security category is different from the selected security category, wherein receiving user input selecting a security category for the second set of domains further includes the user overriding a previously selected security category, and wherein associating the second set of domains with the selected security category in the security database includes replacing a previously selected security category associated with the second set of domains in the security database.

10. The computer usable program product of claim 6, wherein the computer usable code is stored on a non-transitory computer readable storage medium in a data processing system, and wherein the computer usable code was downloaded over a network from a remote data processing system.

11. The computer usable program product of claim 6, wherein the computer usable code is stored on a non-transitory computer readable storage medium in a server data processing system, and wherein the computer usable code is downloaded over a network to a remote data processing system for use in a non-transitory computer readable storage medium with the remote system.

12. A data processing system for managing a security database in a data processing system memory, the data processing system comprising:
a processor; and
a memory storing program instructions which when executed by the processor execute the steps of:
presenting a content delivery unit including a plurality of URLs in a browser window on a computer display;
identifying a domain associated with the content delivery unit from a URL associated with the content delivery unit;
identifying a first set of URLs from the plurality of URLs included in the content delivery unit;
identifying a plurality of domains associated with the content delivery unit from the plurality of URLs, wherein a first set of domains is identified from the first set of URLs;
presenting a list of domains and a set of security categories to the user, the list of domains comprising the domain associated with the content delivery unit and the first set of domains;

receiving user input selecting a security category for a second set of domains, the second set domains comprising a subset of the domain associated with the content delivery unit and the first set of domains based on the user input; and associating the second set of domains with the selected security category in the security database.

13. The data processing system of claim 12, further comprising receiving user input selecting an initial security category prior to presenting the list of domains, wherein presenting the list of domains and the set of security categories to the user includes presenting the selected initial security category to the user, and wherein receiving user input selecting a security category further includes receiving user input regarding the selected initial security category.

14. The data processing system of claim 12, wherein presenting the list of domains and the set of security categories to the user further includes presenting a plurality of protocols to the user, wherein receiving user input further includes receiving user input selecting a set of the plurality of protocols for the second set of domains, and wherein associating in the security database further includes associating the second set of domains with the selected set of the plurality of protocols in the security database.

* * * * *